United States Patent
Zhou et al.

(10) Patent No.: US 12,276,855 B2
(45) Date of Patent: Apr. 15, 2025

(54) FIBER OPTIC DISTRIBUTION BOX

(71) Applicant: Amphenol Fiber Optic Technology (Shenzhen) Co., Ltd., Shenzhen (CN)

(72) Inventors: Jinan Zhou, Shenzhen (CN); Jie-Bing Pan, Shenzhen (CN); Qing-Quan Wan, Shenzhen (CN); Jun-Lin Zhong, Shenzhen (CN); Yong Chen, Shenzhen (CN)

(73) Assignee: AMPHENOL FIBER OPTIC TECHNOLOGY (SHENZHEN) CO., LTD., Shenzhen (CN)

( * ) Notice: Subject to any disclaimer, the term of this patent is extended or adjusted under 35 U.S.C. 154(b) by 314 days.

(21) Appl. No.: 17/947,676

(22) Filed: Sep. 19, 2022

(65) Prior Publication Data

US 2023/0358980 A1   Nov. 9, 2023

(30) Foreign Application Priority Data

May 6, 2022   (CN) .......................... 202221087134.8

(51) Int. Cl.
  *G02B 6/44*   (2006.01)
  *G02B 6/38*   (2006.01)

(52) U.S. Cl.
  CPC ......... *G02B 6/4441* (2013.01); *G02B 6/3825* (2013.01); *G02B 6/3897* (2013.01); *G02B 6/443* (2013.01); *G02B 6/445* (2013.01); *G02B 6/4452* (2013.01); *G02B 6/44715* (2023.05); *G02B 6/44515* (2023.05)

(58) Field of Classification Search
  CPC .. G02B 6/3825; G02B 6/3897; G02B 6/3837; G02B 6/4292
  See application file for complete search history.

(56) References Cited

U.S. PATENT DOCUMENTS

| | | | | |
|---|---|---|---|---|
| 4,558,172 A | * | 12/1985 | Zetena | H01R 13/73 439/536 |
| 4,922,056 A | * | 5/1990 | Larsson | H02G 3/16 174/650 |
| 6,146,192 A | * | 11/2000 | Cabalka | H01R 13/748 439/540.1 |
| 6,607,303 B2 | * | 8/2003 | Ngo | G02B 6/3897 385/60 |
| 6,644,866 B1 | * | 11/2003 | Kusuda | G02B 6/3897 385/136 |
| 9,354,417 B2 | * | 5/2016 | Kingsbury | G02B 6/4471 |

(Continued)

OTHER PUBLICATIONS

Amphenol Multiport Terminal Product Catalog, Amphenol Fiber Optic Products; pp. 1-6; 2019 (Year: 2019).*

*Primary Examiner* — Michelle R Connelly
*Assistant Examiner* — Darby M. Thomason
(74) *Attorney, Agent, or Firm* — MUNCY, GEISSLER, OLDS & LOWE, P.C.

(57) ABSTRACT

A fiber optic distribution box includes a box unit, a protective shield unit pivotally mounted on the box unit, and a plurality of mounting units detachably installed to the box unit for accommodating a plurality of adapters. The box unit includes a box body defining an interior space and a plurality of base brackets disposed on the box body and accommodated in the interior space. Each mounting unit includes a flanged seat and a tubular portion extending obliquely upwardly from the flanged seat.

9 Claims, 10 Drawing Sheets

(56) References Cited

U.S. PATENT DOCUMENTS

| | | | | |
|---|---|---|---|---|
| 10,090,615 | B1* | 10/2018 | Yi | H01R 4/28 |
| 10,209,473 | B2* | 2/2019 | Bishop | G02B 6/44785 |
| 10,281,670 | B2* | 5/2019 | Vaughn | G02B 6/3897 |
| 2007/0116413 | A1* | 5/2007 | Cox | G02B 6/44528 |
| | | | | 385/53 |
| 2011/0097050 | A1* | 4/2011 | Blackwell, Jr. | G02B 6/44515 |
| | | | | 385/88 |
| 2013/0022328 | A1* | 1/2013 | Gronvall | G02B 6/4477 |
| | | | | 385/137 |
| 2013/0108227 | A1* | 5/2013 | Conner | G02B 6/4471 |
| | | | | 385/101 |
| 2018/0314021 | A1* | 11/2018 | Courchaine | G02B 6/3897 |
| 2019/0041595 | A1* | 2/2019 | Reagan | G02B 6/4444 |
| 2019/0212513 | A1* | 7/2019 | Zhou | G02B 6/44528 |

\* cited by examiner

FIBER OPTIC DISTRIBUTION BOX

CROSS-REFERENCE TO RELATED APPLICATIONS

This application claims priority of Chinese Patent Application No. 202221087134.8, filed on May 6, 2022.

FIELD

The disclosure relates to a distribution box, more particularly to a fiber optic distribution box for connecting a fiber optic cable to fiber optic adapters.

BACKGROUND

Generally, when an input fiber optic cable is split, an input optic fiber cable is usually split into a plurality of output fiber optic lines in connection with a plurality of adapters. The split lines are typically accommodated in a fiber optic distribution box with the adapters installed thereon to facilitate storage and connection.

Figure 1:
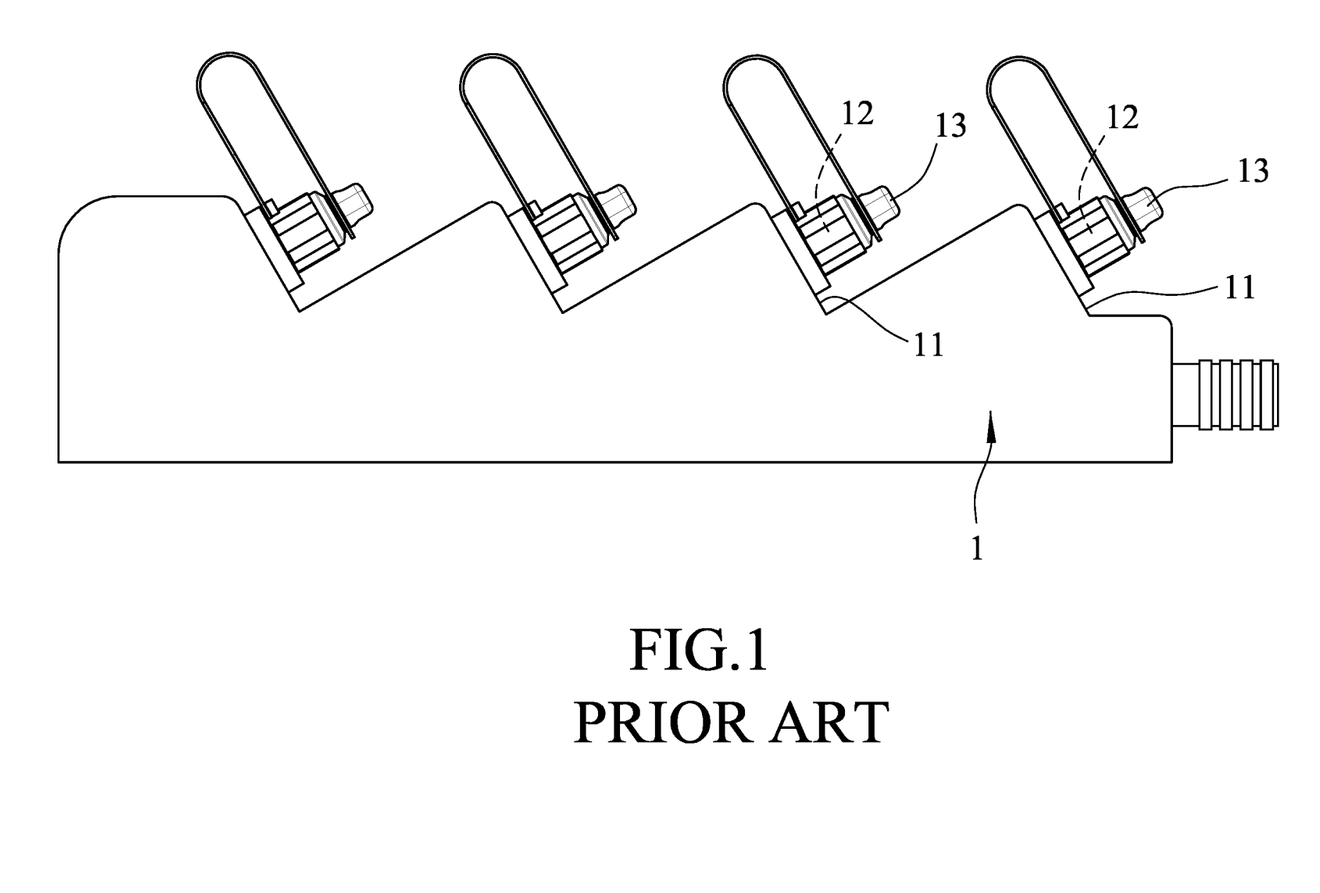
FIG. 1 side is a view illustrating a conventional fiber optic distribution box.

Referring to FIG. 1, when these fiber optic output lines need to extend at a specific angle, a dedicated fiber optic distribution box 1 will be required. The fiber optic distribution box 1 has a plurality of inclined surfaces 11 for installation of the adapters 12. The output fiber optic lines thus can pass through the adapters 12 and extend at a specific angle.

However, the fiber optic distribution box 1 and the inclined surfaces 11 are formed integrally so that, due to the absence of universality, the mold of the fiber optic distribution box 1 must be re-made if the output fiber optic lines are to be extended at a different angle. It leads to increased cost and is difficult to modularization. Besides, when other types of adapters 12 are used, the molding of optical fiber distribution box 1 also involves re-making the mold corresponding to specific adapters 12. In another aspect, the fiber optic distribution box 1 sometimes may be placed outdoors such that it is exposed to harsh environments such as wind and snow. Although the adapters 12 can be protected by a dust cover 13, the protection of the dust cover 13 is still insufficient in case of accumulation of snow or water. Thus, there is still room for improvement.

SUMMARY

Therefore, the object of the disclosure is to provide a fiber optic distribution box that is easy to modularization and has high durability.

According to the disclosure, a fiber optic distribution box includes a box unit, a protective shield unit pivotally mounted on the box unit, and a plurality of mounting units detachably installed to the box unit for accommodating a plurality of adapters. The box unit includes a box body defining an interior space and a plurality of base brackets disposed on the box body and accommodated in the interior space. Each mounting unit includes a flanged seat and a tubular portion extending obliquely upwardly from the flanged seat.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
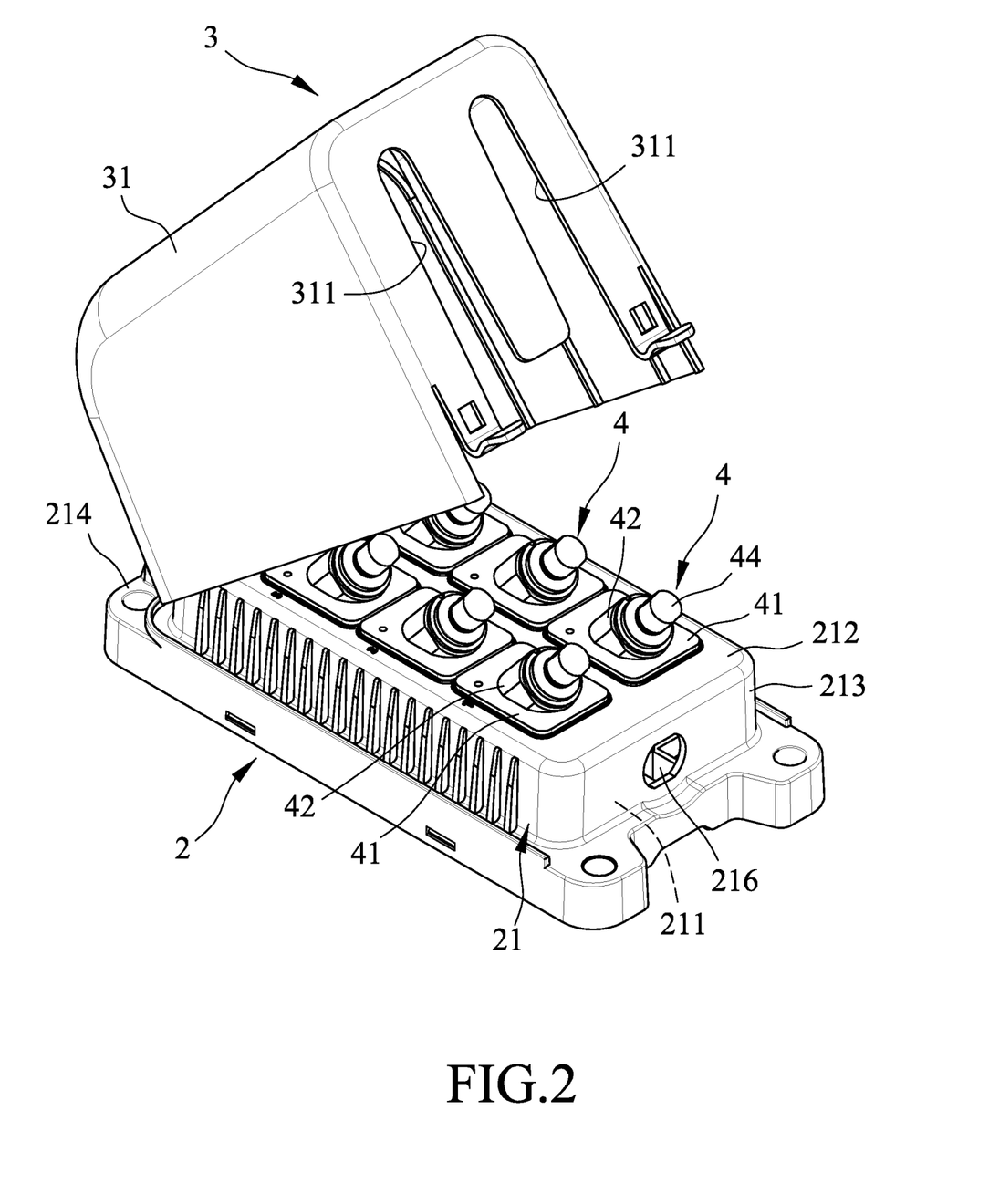
FIG. 2 is a perspective view of an embodiment of a fiber optic distribution box according to the disclosure.
Figure 3:
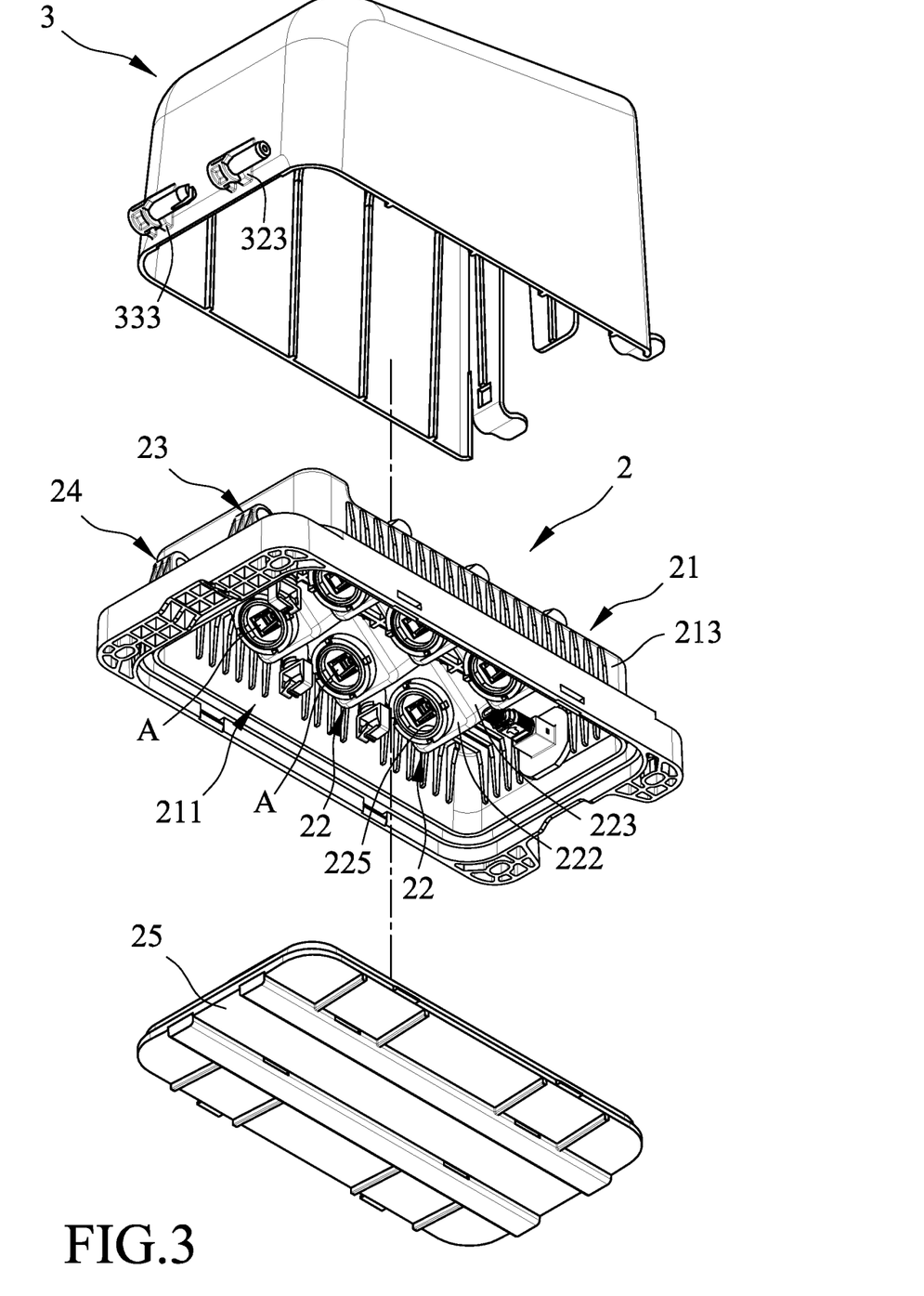
FIG. 3 is an exploded perspective view of the embodiment.
Figure 4:
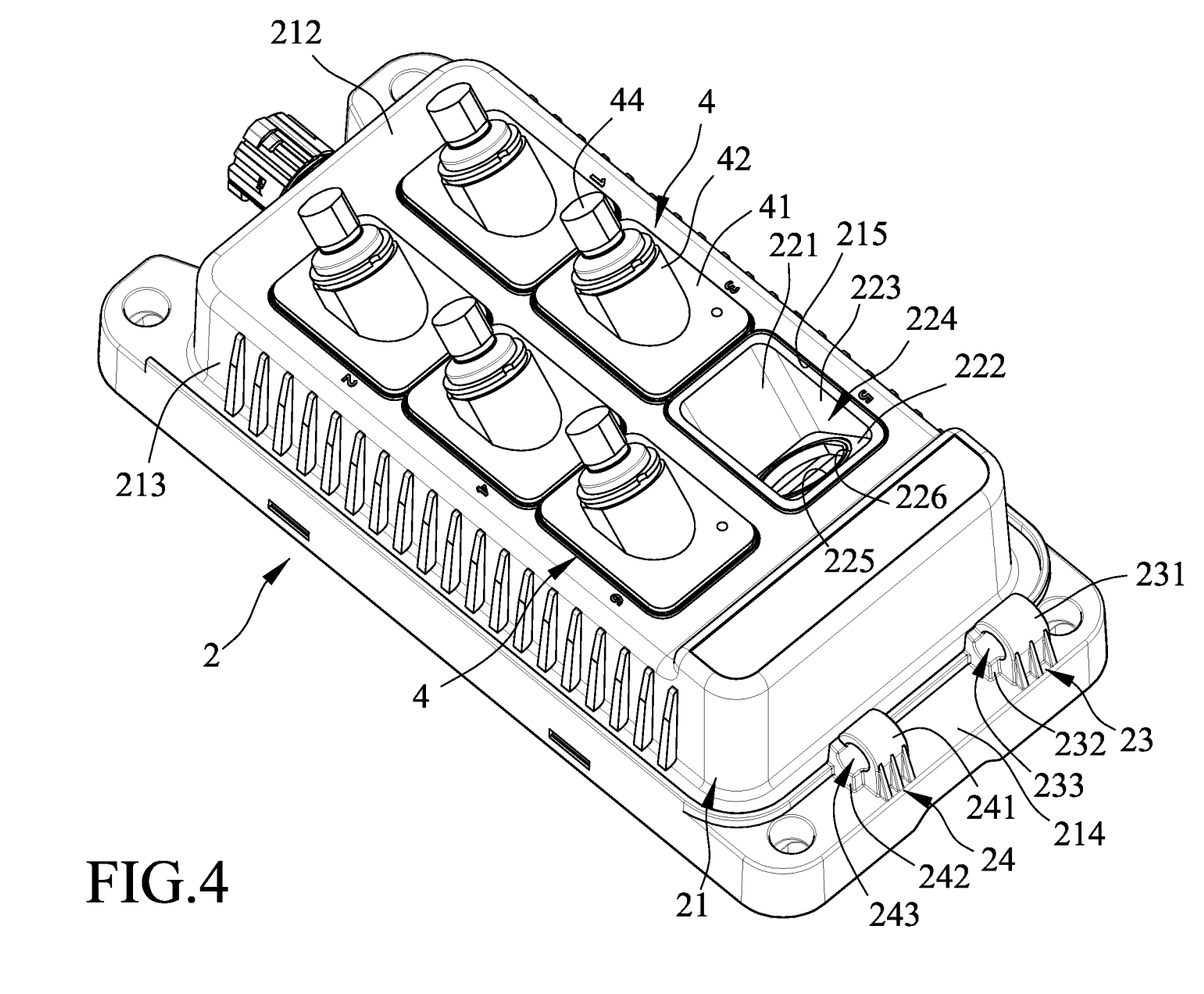
FIG. 4 is a schematic perspective view of a box unit and a plurality of mounting units of the embodiment, one of the mounting units being removed for illustrating the structure of a base bracket.

As shown in FIGS. 2 to 4, the embodiment of the fiber optic distribution box according to the present disclosure includes a box unit 2, a protective shield unit 3 pivotally disposed on the box unit 2, and a plurality of mounting unit 4 detachably disposed on the box unit 2. It should be noted that, in this embodiment, to simplify the explanation of the relative relationship between the components, the openable end of the protective shield unit 3 is represented as the front end, and the pivotally mounting end of the protective shield unit 3 is represented as the rear end. The left-right direction, also depicted as left-right direction, is perpendicular to the front-rear and height directions.

The box unit 2 includes a box body 21 defining an interior space 211, a plurality of base brackets 22 connected to the box body 21 and located in the interior space 211, a first pivot base 23 disposed on a rear end portion of the box body 21, a second pivot base 24 disposed on the rear end portion of the box body 21 and spaced apart from the first pivot base 23 along the left-right direction, and a bottom cover 25 disposed under the box body 21 for closing the interior space 211. The box body 21 has a top wall 212, a surrounding wall 213 extending downwardly from a periphery of the top wall 212, and a looped bottom wall 214 disposed under the surrounding wall 213 and having a rear floor extension. The top wall 212 is formed with a plurality of openings 215 arranged in a matrix of rows and columns. The surrounding wall 213 has an input hole 216 (see FIG. 2) communicated with the interior space 211 so as to allow an input fiber optic cable to extend through the input hole 216, as shown in FIG. 3.

Figure 5:
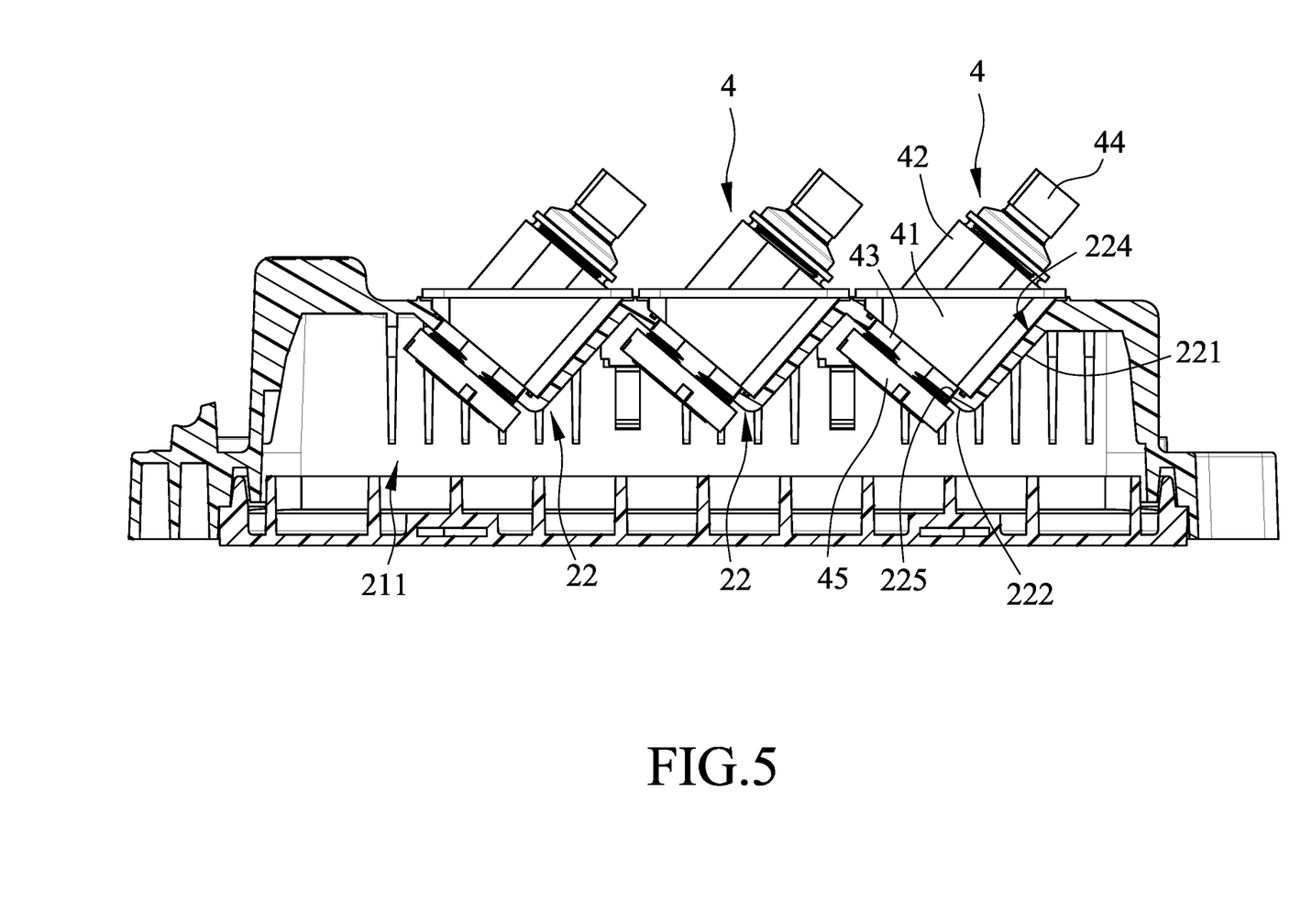
FIG. 5 is a sectional side view of the box body and the mounting units of the embodiment.

Referring to FIGS. 3 to 5, each base bracket 22 has a front end wall 221 extending obliquely downwardly from the top wall 212 of the box body 21, a rear end wall 222 extending downwardly from the top wall 212 and connected with the front end wall 221, and two side walls 223 extending downwardly from the top wall 212 and connected between the front end wall 221 and the rear end wall 222. The front end wall 221, the rear end wall 222, and the side walls 223 cooperate to define an accommodating cavity 224 communicated with the opening 215. The rear end wall 222 is formed with an aperture 225 communicated between the accommodating cavity 224 and the interior space 211, and an annular groove 226 around the aperture 225.

Figure 6:
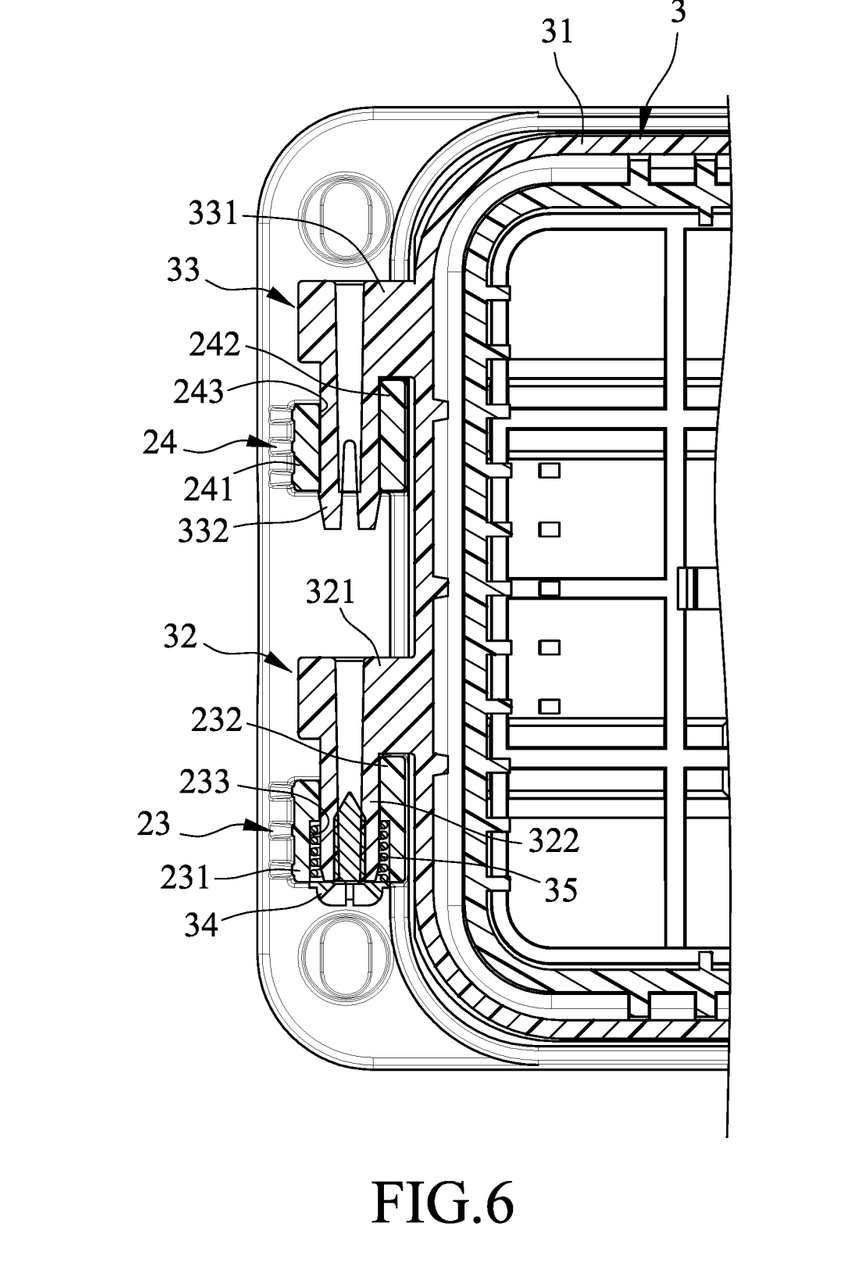
FIG. 6 is a fragmentary horizontal cross-section view of the embodiment illustrating first and second pivot bases, and first and second pivot members.

Referring to FIG. 4 and FIG. 6, the first pivot base 23 has a first pivot rod support 231 disposed on the bottom wall 214, and a first positioning portion 232 protruding from the first pivot rod support 231 toward the second pivot base 24 along the left-right direction. The first pivot rod support 231 is formed with an axial counterbore 233. The second pivot base 24 has a second pivot rod support 241 disposed on the bottom wall 214 and a second positioning portion 242 protruding from the second pivot rod support 241 away from the second pivot base 24 along the left-right direction. The second pivot rod support 241 is formed with a bore 243 coaxial with the axial counterbore 233.

Figure 7:
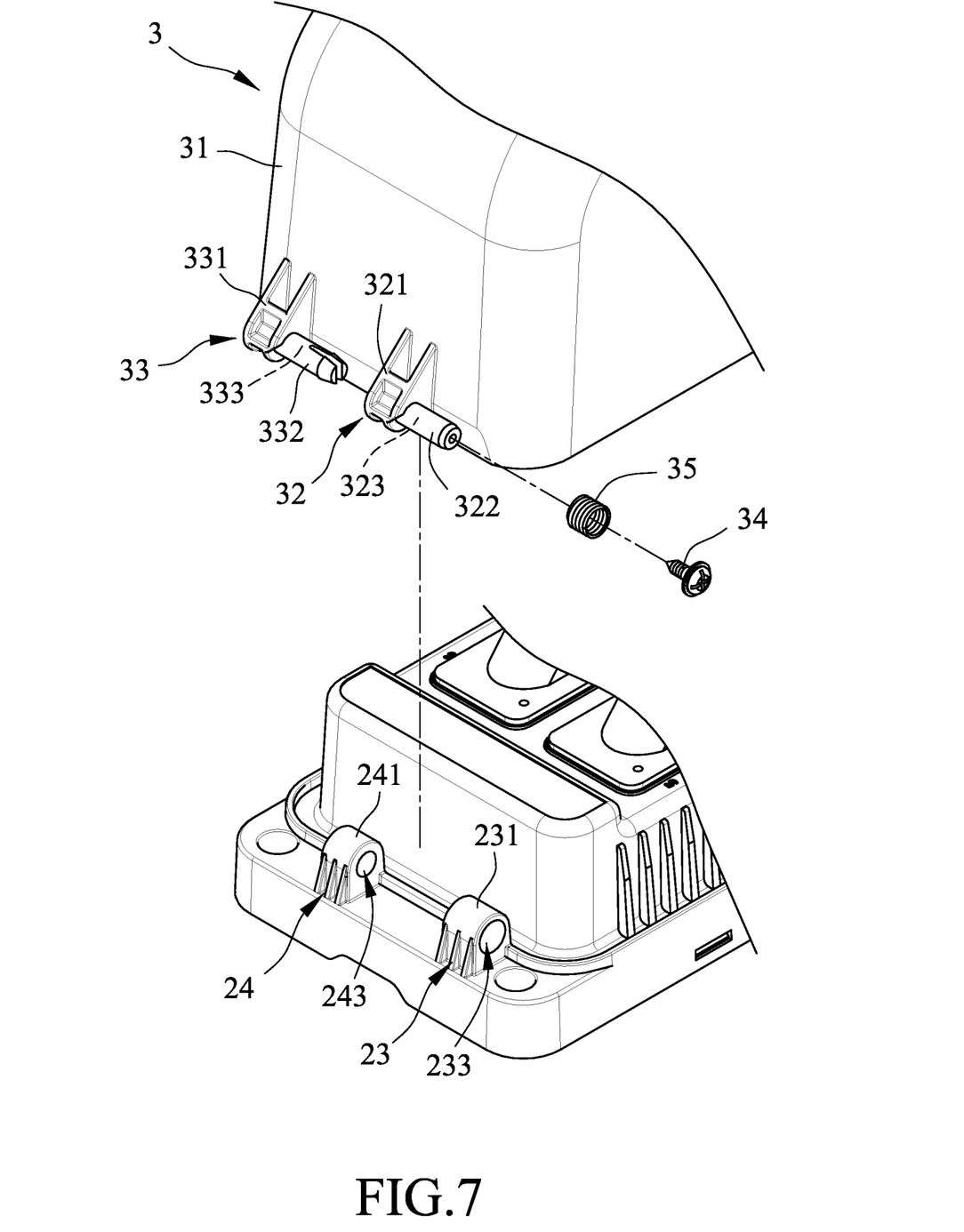
FIG. 7 is a fragmentary exploded perspective view of the embodiment.
Figure 8:
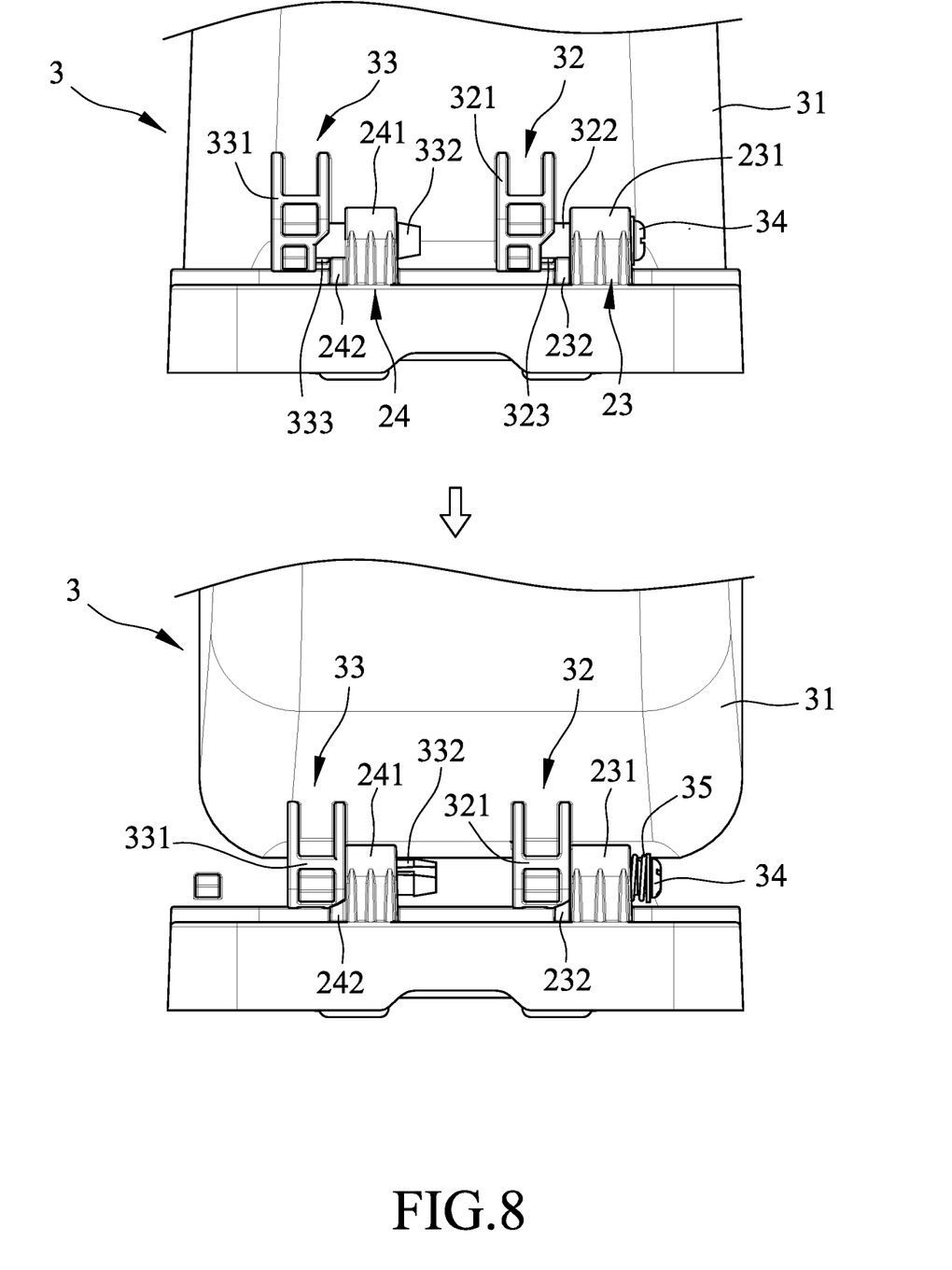
FIG. 8 is a fragmentary end view for illustrating the actuation of the protective shield unit of the embodiment.

Referring to FIGS. 6 to 8, the protective shield unit 3 includes a hood body 31, a first pivot member 32 extending rearwardly from the hood body 31, a second pivot member 33 extending rearwardly from the hood body 31 and spaced apart from the first pivot member 32 along the left-right direction, a control bolt 34 engaging threadedly the first pivot member 32 in the left-right direction, and a spring 35 having at least a portion disposed in the axial counterbore 233, and two ends abutting respectively against the first pivot base 23 and the control bolt 34. Optionally, the hood body 31 can be formed with notches 311 (see FIG. 2) extending in the height direction for extension of output fiber optic lines. The first pivot member 32 has a first bracket 321 connected to the hood body 31 and adjacent to and spaced apart from the first pivot rod support 231 in the left-right direction, a pivot rod 322 extending from the first bracket 321 and through the axial counterbore 233 along the left-right direction, and a first stop portion 323 protruding from the first bracket 321. The second pivot member 33 has a second bracket 331 connected to the hood body 31 and adjacent to and spaced apart from the second pivot rod support 241 in the left-right direction, a pivot rod 332 extending from the second bracket 331 and through the bore 243 along the left-right direction, and a second stop portion 333 protruding from the second bracket 331. The control bolt 34 engaging threadedly an axial end of the pivot rod 322 opposite to the first bracket 321. The first bracket 321 and a head of the control bolt 34 are located on opposite ends of the first pivot rod support 231 in the left-right direction. The control bolt 34 has a head having a diameter larger than that of the axial counterbore 233 can retain the first pivot member 32 on the first pivot base 23. The spring 35 is sleeved on the pivot rod 322. The end of pivot rod 332 distal from the second bracket 331 is bifurcated, and has an outer diameter larger than that of the bore 243, so as to hold the second pivot member 33 onto the second pivot base 24.

Figure 9:
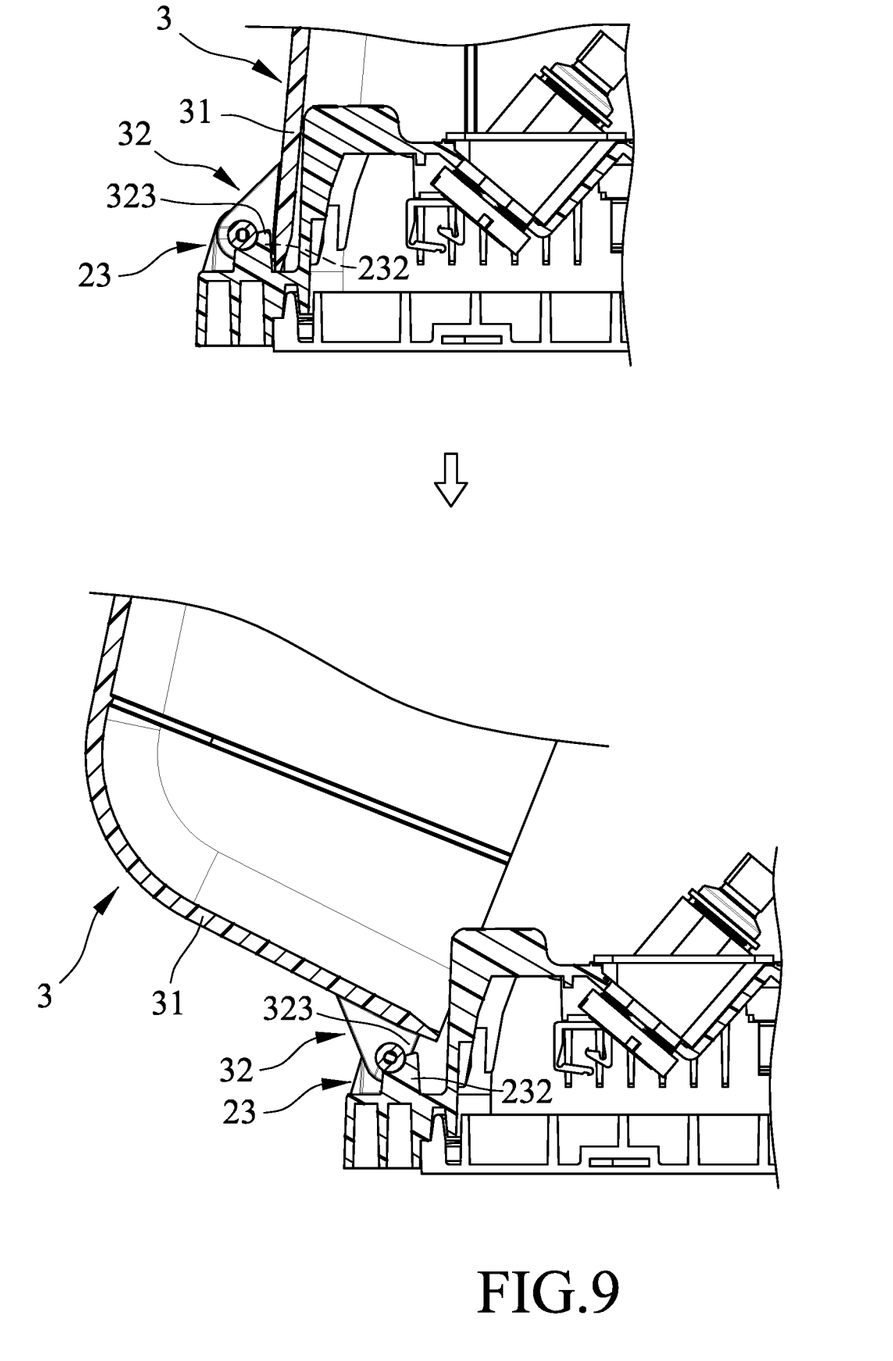
FIG. 9 is a fragmentary sectional side view for illustrating the actuation of the protective shield unit of the embodiment.

Referring to FIG. 6, FIG. 8, and FIG. 9, when the protective shield unit 3 is in a closed position, as shown in the upper diagrams of FIGS. 8 and 9, the control bolt 34 is urged outwards under the biasing of the spring 35, and the first stop portion 323 tightly abuts against the first positioning portion 232 in the left-right direction, as well as, the second stop portion 333 tightly abuts against the second positioning portion 242 in the left-right direction. At this position, the first and second pivot rod supports 231 and 241 are kept an interval with the first and second brackets 321 and 331 in the left-right direction, respectively. When the hood body 31 is pivoted upwards to open, the first and second stop portions 323, 333 move upwardly past the first and second positioning portions 232, 242, respectively, as shown in the lower diagram of FIG. 9. Under the resilient force of the spring 35, the first and second pivot members 32, 33 are urged toward the first and second pivot bases 23, 24, until they come into contact with the first and second d pivot rod supports 231, 241 respectively in the left-right direction, as seen in the lower diagrams of FIG. 8. At this time, the first and second stop portions 323, 333 are positioned directly above the first and second positioning portions 232, 242 and blocked from moving downwards, so that the protective shield unit 3 is kept in an open position. When the protective shield unit 3 is released, the first and second stop portions 323, 333 move downwardly to abut downwardly against the first and second positioning portions 232, 242, respectively, by virtue of gravity. When it is intended to close down the hood body 31 again, it is only necessary to press the head of the control bolt 34 to separate the first and second stop portions 323, 333 from the top of the first and second positioning portions 232, 242 along the left-right direction, then allowing downward pivotal movement of the protective shield unit 3 to the closed position.

Figure 10:
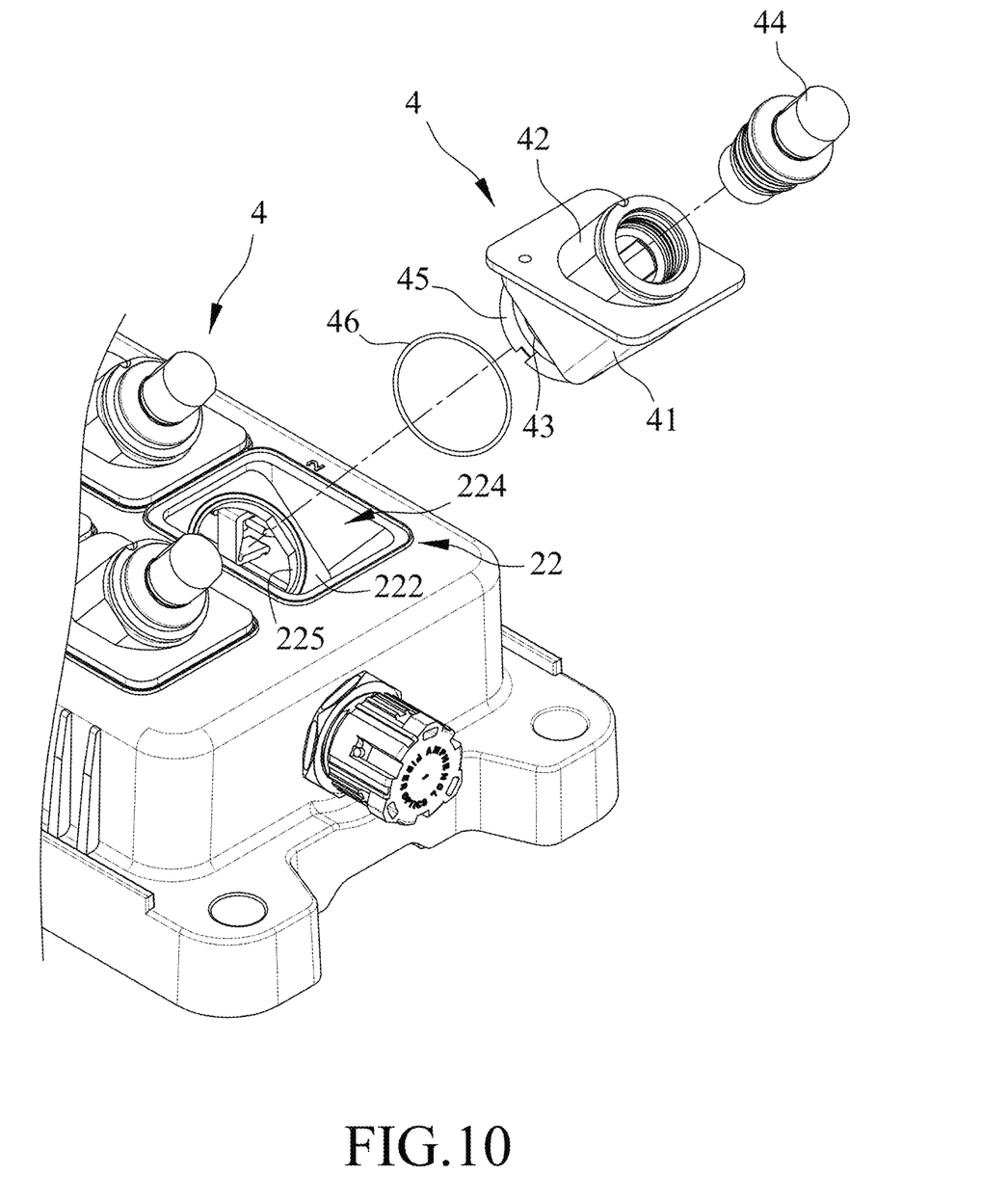
FIG. 10 is a fragmentary exploded perspective view illustrating the base bracket and one of the mounting units of the embodiment.

Referring to FIG. 4, FIG. 5, and FIG. 10, the mounting units 4 are each detachably installed in the respective accommodating cavity 224. Each mounting unit 4 includes a flanged seat 41 positioned in the corresponding accommodating cavity 224. The flanged seat 41 has an tubular portion 42 extending obliquely upwardly from the flanged seat 41, an externally threaded fastening tube 43 extending obliquely downwardly from the flanged seat 41 and through the aperture 225 of the corresponding base bracket 22, a dust cover 44 detachably mounted on the tubular portion 42, an internally threaded locking collar 45 engaging threadedly the externally threaded fastening tube 43 and disposed in the interior space 211 and behind the rear end wall 222, and a sealing ring 46 located in the annular groove 226 of the corresponding base bracket 22 and surrounding the externally threaded fastening tube 43. The flanged seat 41 conforms in shape to the accommodating cavity 224. In this embodiment, the flanged seat 41 is generally in the shape of a hollow triangular cone, but it is not limited to that. The internally threaded locking collar 45 cooperates with the externally threaded fastening tube 43 to secure the flanged seat 41 in the accommodating cavity 224. The mounting unit 4 can be removed for repair or replacement when the internally threaded locking collar 45 is removed. The sealing ring 46 is disposed around the aperture 225 in the rear end wall 222, surrounds the externally threaded fastening tube 43, and tightly abuts against the flanged seat 41 to prevent dirt or moisture from entering the interior space 211 through the aperture 225.

Referring again to FIG. 2, FIG. 3, and FIG. 5, in this embodiment, when the fiber optic cable is split to the fiber optic distribution box, the input fiber optic cable passes through the input hole 216, the fiber optic output lines are partially accommodated in the interior space 211, a plurality of adapters A for the fiber optic output lines are respectively engaged in the flanged seats 41 of the mounting units 4. The tubular portion 42 can fix the output fiber optic at a specific angle depending on the oblique angle of the tubular portion 42. When the extension angle of the fiber optic output line needs to be altered, it is only necessary to replace the mounting unit 4 with one having a tubular portion 42 with the required inclination angle. Therefore, the box unit 2 can be used universally and is beneficial to modularization, and can reduce the cost of mold making.

Furthermore, when the fiber optic distribution box is installed in a harsh environment, in addition to the dust covers 44 fixed on the unused tubular portions 42, the protective shield unit 3 can be put in a closed position to protect the mounting unit 4, thus preventing damage to the adapters A in the flanged seats 41. When the hood body 31 is opened, it can be secured at a specific angle through the cooperation of the first and second stop portions 323, 333 and the first and second positioning portions 232, 242, which is convenient for the operator and does not require any further fixing measures. To close the hood body 31 after the manipulation, simply press the control bolt 34 to allow pivoting the protective shield unit 3 to a closed position without additional tools.

In summary, according to the present disclosure, the extension angle of the output fiber optic line can be altered by replacing the mounting units 4, which is beneficial to modularization and flexibility; in addition, the overall protection can be improved by closing the hood body 31, if it is needed for manipulating, the protective shield unit 3 can be switched to an open position and fixed at a specific angle.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic distribution box, comprising:
    a box unit, including a box body defining an interior space, and a plurality of base brackets disposed on said box body and accommodated in said interior space, said box body having a top wall formed with a plurality of openings, each of said base brackets being connected to said top wall and defining an accommodating cavity communicated with respective openings;
    a protective shield unit having a rear end portion pivotally mounted on said box unit and pivotable between a closed position and an open position relative to said box unit about an axis extending along a left-right direction;
    a plurality of mounting units each detachably installed in a respective one of said accommodating cavities of said base brackets, each of said mounting units including a flanged seat positioned in a corresponding one of said accommodating cavities, and a tubular portion extending obliquely upwardly from said flanged seat, said mounting units being covered by said protective shield unit when at the closed position;
    wherein said box unit further includes a first pivot base disposed on said box body and defining an axial counterbore, and a second pivot base disposed on said box body and spaced apart from said first pivot base along the left-right direction; and
    wherein said protective shield unit includes
    a hood body,
    a first pivot member extending rearwardly from said hood body and pivotally mounted to said first pivot base, said first pivot member having a first bracket connected with said hood body and a pivot rod extending from said first bracket and through said axial counterbore along the left-right direction,
    a second pivot member extending rearwardly from said hood body and pivotally mounted to said second pivot base,
    a control bolt engaging threadedly one end of said pivot rod opposite to said first bracket and having a head, and
    a spring sleeved on said pivot rod, disposed between said first pivot base and said head of said control bolt, and having at least a portion disposed in said axial counterbore for biasing said head of said control bolt away from said first pivot base.

2. The fiber optic distribution box as claimed in claim 1, wherein
    said first pivot base of said box unit has a first pivot rod support formed with said axial counterbore and a first positioning portion protruding from said first pivot rod support toward said first pivot member along the left-right direction; and
    said first pivot member of said protective shield unit has a first stop portion protruding from said first bracket, said first stop portion being biased by said spring to contact said first positioning portion along the left-right direction when said protective shield unit is at the closed position, thereby allowing upward pivotal movement of said protective shield unit to the open position, said first stop portion abutting downwardly against said first positioning portion when said protective shield unit is at the open position, so as to prevent downward pivotal movement of said protective shield unit to the closed position, thereby maintaining said protective shield unit at the open position; and
    when said protective shield unit is at the open position, said control bolt is pushable against the biasing action of said spring to move said first pivot member relative to said first pivot base, so as to separate said first stop portion from said first positioning portion along the left-right direction, thereby allowing the downward pivotal movement of said protective shield unit to the closed position.

3. The fiber optic distribution box as claimed in claim 2, wherein
    said second pivot base of said box unit has a second pivot rod support formed with a bore extending along the left-right direction, and a second positioning portion protruding from said second pivot rod support toward said second pivot member along the left-right direction;
    said second pivot member of said protective shield unit has a second bracket connected with said hood body, a pivot rod extending from said second bracket and through said bore along the left-right direction, and a second stop portion protruding from said second bracket, said pivot rod of said second pivot member has a bifurcated end distal from said second bracket and extending out of said bore and has an outer diameter larger than that of said bore, said second stop portion abutting downwardly against said second positioning portion when said protective shield unit is at said open position, so as to prevent downward pivotal movement of said protective shield unit to the closed position, thereby maintaining said protective shield unit at the open position; and when said protective shield unit is pivoted from the open position to the closed position, said second stop portion comes into contact with said second positioning portion along the left-right direction, so as to allow upward pivot movement of said protective shield unit to the open position.

4. The fiber optic distribution box as claimed in claim 1, wherein each of said base brackets of said box unit has a front end wall connected with said top wall of said box body, a rear end wall connected between said top wall and said front end wall, and two side walls extending downwardly from said top wall and connected between said front end wall and said rear end wall, such that said front end wall cooperating with said rear end wall and said two side walls to define said accommodating cavity, said rear end wall being formed with an aperture communicated with and disposed between said accommodating cavity and said interior space, each of said mounting units further including a fastening tube extending obliquely downwardly from said flanged seat and through said aperture of a respective one of said base brackets, and a locking collar engaging said fastening tube and disposed in said interior space and behind said rear end wall.

5. The fiber optic distribution box as claimed in claim 4, wherein each of said mounting units further includes a dust cover detachably mounted on said tubular portion.

6. The fiber optic distribution box as claimed in claim 4, wherein said flanged seat of each of said mounting units is in the shape of a hollow triangular column.

7. The fiber optic distribution box as claimed in claim 4, wherein said rear end wall of each of said base brackets of said box unit is formed with an annular groove disposed around said aperture, and each of said mounting units further includes a sealing ring located in said annular groove of a corresponding one of said base brackets of said box unit, surrounding said fastening tube, and tightly abutting against said flanged seat.

8. The fiber optic distribution box as claimed in claim 1, wherein said box body of said box unit further has a surrounding wall extending downwardly from said top wall, and a bottom wall positioned under said surrounding wall and having a rear floor extension for disposition of said first pivot base and said second pivot base thereon, said surrounding wall having a front input hole communicated with said interior space and adapted for extension of a fiber optic cable therethrough.

9. The fiber optic distribution box as claimed in claim 8, wherein said box unit further has a bottom cover that is covered on said bottom wall of said box body to close said interior space.

* * * * *